United States Patent
Phillips et al.

(10) Patent No.: US 6,842,833 B1
(45) Date of Patent: Jan. 11, 2005

(54) COMPUTER SYSTEM AND METHOD FOR TRANSFERRING DATA BETWEEN MULTIPLE PEER-LEVEL STORAGE UNITS

(75) Inventors: Gary L. Phillips, Houston, TX (US); Robert S. Gready, Spring, TX (US); Raymond A. Ritter, Spring, TX (US); Eugene E. Freeman, The Woodlands, TX (US); John E. Dimitroff, Houston, TX (US); David L. Grant, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 711 days.

(21) Appl. No.: 09/107,539

(22) Filed: Jun. 30, 1998

(51) Int. Cl.[7] ............................................. G06F 12/00
(52) U.S. Cl. ........................ 711/162; 711/112; 711/114; 707/204
(58) Field of Search .............................. 707/204; 711/4, 711/112, 161, 114, 162; 714/5–7; 709/212–219

(56) References Cited

U.S. PATENT DOCUMENTS 5,537,585 A * 7/1996 Blickenstaff et al. ....... 707/205
5,586,250 A * 12/1996 Carbonneau et al. ......... 714/44
5,832,522 A * 11/1998 Blickenstaff et al. ....... 707/204
6,000,020 A * 12/1999 Chin et al. ................... 711/162
6,023,709 A * 2/2000 Anglin et al. ............... 707/204
6,173,377 B1 * 1/2001 Yanai et al. ................. 711/162

* cited by examiner

Primary Examiner—Pierre M Vital

(57) ABSTRACT

A computer system and storage management method for routing data between peer-level storage units. The computer system includes a first storage unit (e.g., disk drive) and an intelligent controller connected to a storage area network. The intelligent controller is also connected to a second storage unit (e.g., tape drive). The computer system further includes a host (server and/or workstation) having an application module for generating and transmitting a command to the intelligent controller by way of the storage area network or a system network. In response to the transmitted command, the intelligent controller routes data between the first storage unit and the second storage unit using the storage area network while bypassing the host.

36 Claims, 4 Drawing Sheets

COMPUTER SYSTEM AND METHOD FOR TRANSFERRING DATA BETWEEN MULTIPLE PEER-LEVEL STORAGE UNITS

BACKGROUND OF THE INVENTION

1. Technical Field of the Invention

The present invention relates to a computer system and method for transferring data between multiple peer-level storage units and, in particular, to a computer system and method using an intelligent controller and storage area network for routing data between peer-level storage units.

2. Description of Related Art

Currently, one of the most significant design challenges for manufacturers of computer systems is the development of efficient storage management systems and procedures for routing data between different storage units. Storage management procedures generally include copying or moving data from a disk drive and then transferring the data to a tape drive for archival and backup purposes. The backup or archived data may be restored from the tape drive if, for example, the data on the disk drive is destroyed or a user wants to retrieve the archived data.

Referring to FIG. 1A, there is illustrated a conventional computer system 100 including a storage management scheme having two backup data paths 102 and 104. In describing the components associated with the first backup data path 102, the conventional computer system 100 includes a first server 106 coupled to a first disk drive 108 by a first fibre channel network 110. The first server 106 is also coupled to a tape drive 112 using a Small Computer System Interface ("SCSI") bus 114. The first disk drive 108 operates to store data 116 that may be transferred for archival or backup purposes to the tape drive 112 by way of the first backup data path 102. More specifically, the data 116 traverses the first backup data path 102 by utilizing the first disk drive 108, the first fibre channel network 110, the first server 106 and the SCSI bus 114 before arriving at the tape drive 112. On the other hand, the tape drive 112 may include data 117 (e.g., backup data) that can be moved or restored to the first disk drive 108 by way of the first backup data path 102.

In describing the components associated with the second data path 104, the conventional computer system 100 includes a system network 118 (e.g., Local Area Network ("LAN")) for coupling a second server 120 to the first server 106. A second fibre channel network 122 connects the second server 120 to a second disk drive 124. The second disk drive 124 stores data 126 capable of being transferred via the second backup data path 104 to the tape drive 112. More specifically, the data 126 traverses the second backup data path 104 by utilizing the second disk drive 124, the second fibre channel network 122, the second server 120, the system network 118, the first server 106 and the SCSI bus 114 prior to arriving at the tape drive 112. Likewise, the data 117 located in the tape drive 112 may be moved or restored to the second disk drive 124 by way of the second backup data path 104.

Unfortunately, the routing of data 116, 117 or 126 through either of the two backup data paths 102 or 104 includes moving the data through at least one of the servers 106 and 120. The moving of data 116, 117 or 126 through any of the servers 106 and 120 is problematic, because, each server has a limited memory bandwidth and a limited Input/Output capacity which can lead to a bottleneck for the passing data 116 or 126. Any bottlenecks will obviously degrade the performance of the conventional computer system 100.

Moreover, the routing of data 126 or 117 through the system network 118 using the second backup data path 104 is also problematic, because, the system network also has a limited bandwidth which can lead to another potential bottleneck for the passing data 126. To overcome the potential bottleneck associated with the system network 118, a second conventional computer system 150 has been developed to include a third backup data path 152 that will be discussed with reference to FIG. 1B.

Referring to FIG. 1B, there is illustrated the second conventional computer system 150 including a storage management scheme having the third backup data path 152. In describing the components associated with the third backup data path 152, the second conventional computer system 150 includes a third server 154 coupled to a third disk drive 156 (e.g., library of disk drives) and a tape drive 158 via a storage area network 160 (e.g., fibre channel network). Generally, the third disk drive 156 operates to store data 162 that may be transferred to the tape drive 158 by way of the third backup data path 152, where the data traverses not only the third server 154 but the storage area network 160 (twice) prior to reaching the tape drive. However, the data 162 is still transferred through the third server 154 which has the same bottleneck problem discussed earlier with reference to the first and second servers 106 and 120 of FIG. 1A.

Accordingly, there is a need for a computer system and method using an intelligent controller and storage area network for routing data between peer-level storage units while bypassing a server or workstation. There is also a need to free the server from moving data through its memory and interconnects during backup or archival procedures. These and other needs are satisfied by the computer system and storage management method of the present invention.

SUMMARY OF THE INVENTION

The present invention is a computer system and storage management method for routing data between peer-level storage units. The computer system includes a first storage unit (e.g., disk drive) and an intelligent controller connected to a storage area network. The intelligent controller is also connected to a second storage unit (e.g., tape drive). The computer system further includes a host (server and/or workstation) having an application module for generating and transmitting a command to the intelligent controller by way of the storage area network or a system network. In response to the transmitted command, the intelligent controller routes data between the first storage unit and the second storage unit using the storage area network while bypassing the host.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 2:
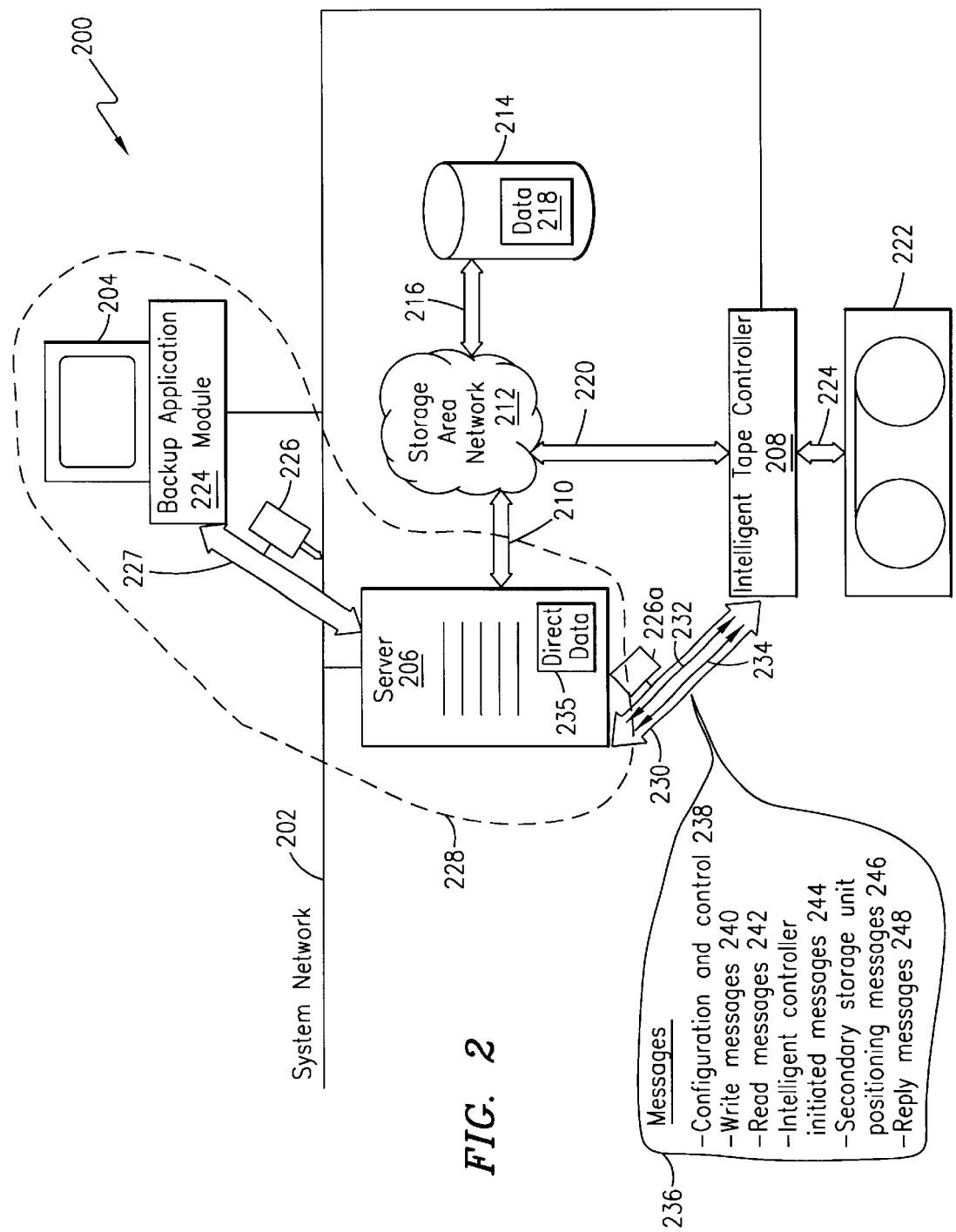
FIG. 2 is a block diagram of a computer system having an intelligent controller in accordance with the present invention.
Figure 3:
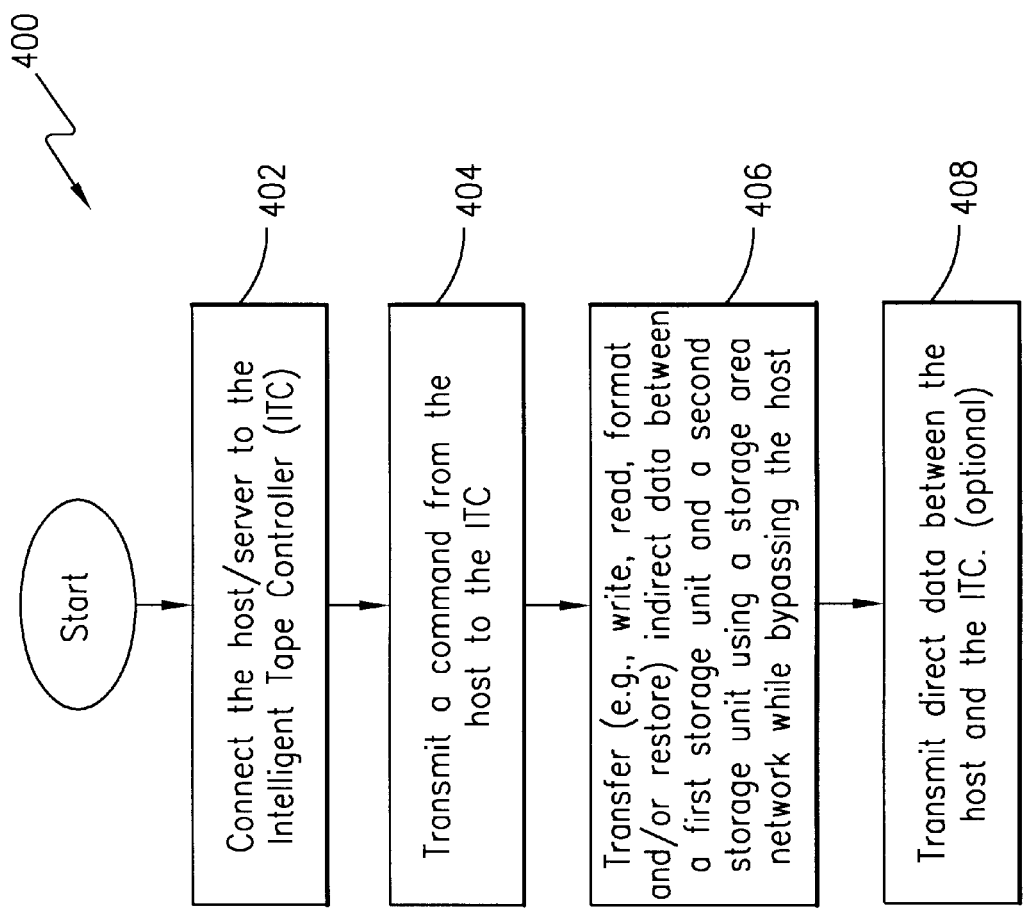
FIG. 3 is a simplified flow diagram of an operation of a storage management procedure used by the computer system of FIG. 2.

Referring to the Drawings, wherein like numerals represent like parts throughout FIGS. 2–3, there is disclosed an embodiment of an exemplary computer system 200 (FIG. 2) and a storage management method 400 (FIG. 3) in accordance with the present invention.

Figure 1A:
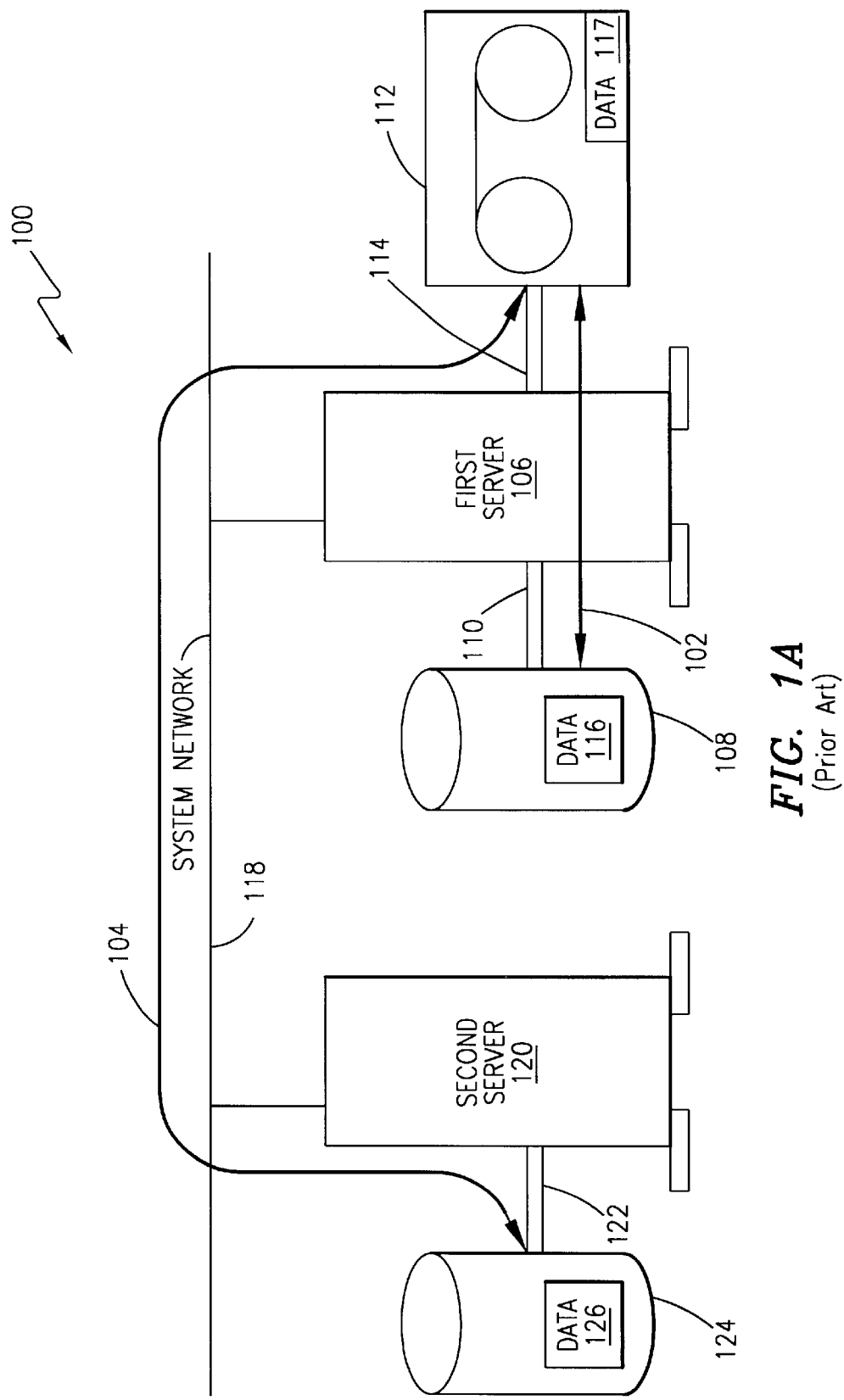
FIG. 1A (prior art) is a block diagram of a conventional computer system having a known storage management.
Figure 1B:
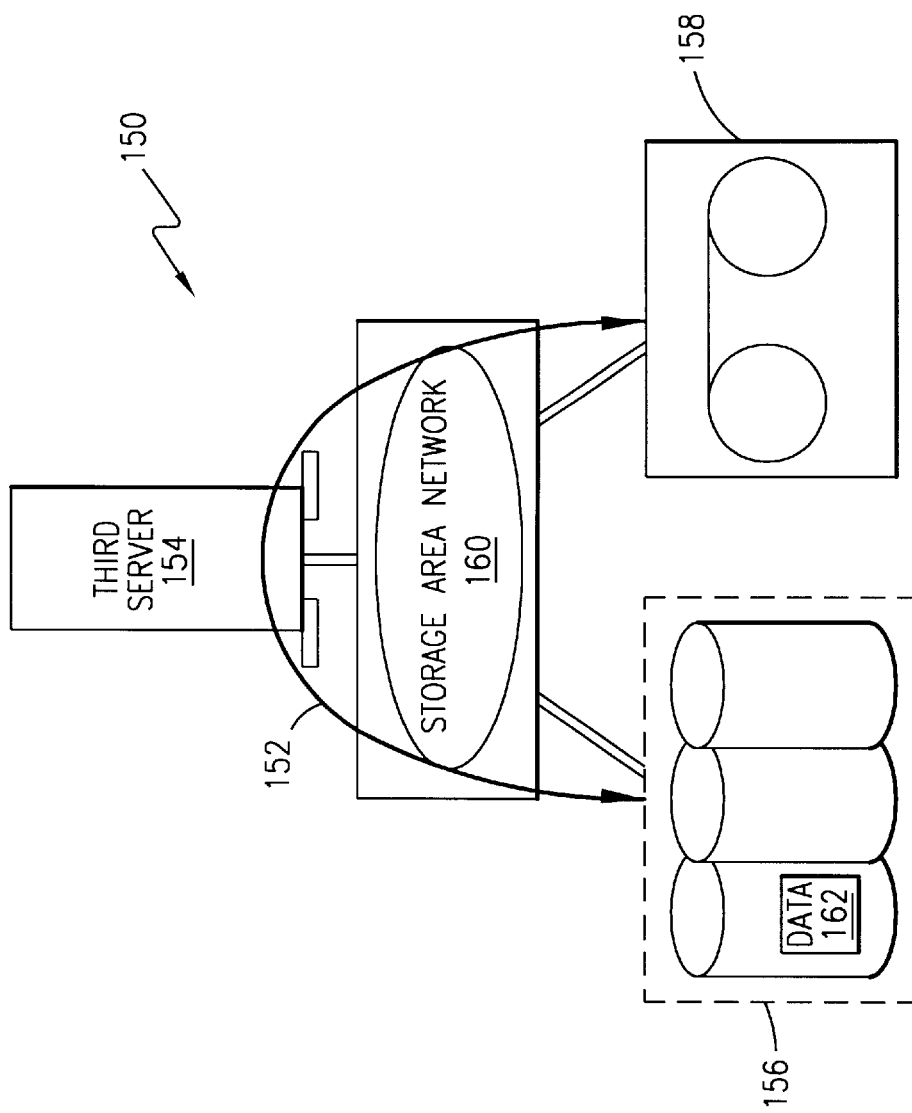
FIG. 1B (prior art) is a block diagram of a second conventional computer having a second storage management scheme system.

For clarity, certain details associated with the computer system 200 are well known in the industry and as such are not described herein. Therefore, the description provided below in relation to the computer system 200 and the storage management method 400 describes only the components necessary to understand the present invention. Likewise, only the necessary components associated with the conventional computer systems 100 and 150 and known storage management schemes were discussed and illustrated with reference to FIGS. 1A and 1B.

Referring to FIG. 2, there is illustrated a block diagram of the computer system 200 in accordance with the present invention. The computer system 200 is preferably configured using a system network 202 such as a Local Area Network (LAN), a System Area Network (SAN) or a Wide Area Network (WAN). The system network 202 can be a high-speed communication system designed to link a workstation 204, a server 206 and an intelligent tape controller 208 together for sharing computing resources including hardware, application programs and information. Of course, there may be more than one workstation 204, server 206 and/or intelligent tape controller 208 incorporated within the computer system 200.

The server 206 connects to a storage area network 212 using line 210, where the storage area network is transport independent and preferably based on the Fibre Channel standard. The Fibre Channel standard is well known in the industry and is hereby incorporated to the fullest extent possible into this specification.

The storage area network 212 also connects to at least one first storage unit 214 using line 216. The first storage unit 214 is generally a disk drive, but may be an optical drive or a tape drive. In addition, the first storage unit 214 may be a library of disc drives, optical drives or tape drives. The first storage unit 214 operates to store data 218 including file(s) and/or image(s).

The intelligent tape controller 208 connects to the storage area network 212 via line 220. In addition, the intelligent tape controller 208 connects to at least one second storage unit 222 using line 224. The second storage unit 222 is generally a tape drive, but may be a disk drive and/or an optical drive. In addition, the second storage unit 222 can be a library of tape drives, disc drives or optical drives. For purposes of clarity, the first and second storage units 214 and 222 are referred to herein as the disk and tape drive, respectively.

In order to better describe the present invention, it is beneficial to reclarify that one aspect of the computer system 200 is to route the data 218 from the disk drive 214 through the storage area network 212 and the intelligent tape controller 208 into the tape drive 222 while bypassing the server 206.

To that end, the workstation 204 includes a backup application module 224 for generating and transmitting a command 226 to the server 206. Alternatively, the server 206 and the workstation 204 including the backup application module 224 may be combined in a distributed manner to form a host 228. In response to receiving the command 226, the server 206 reads, alters (optional) and forwards to the intelligent tape controller 208 the command having information pertaining to the location(s) of the data 218. The intelligent tape controller 208, operating in Peer-Mode, completes the actual Input/Output operations for routing the data 218 from the disk drive 214 to the tape drive 222 through the storage area network 212 without going through the server 206.

More particularly, the workstation 204 and the backup application module 224 generally transmit the command 226 to the server 206 using a vendor specific protocol 227, which is dependent upon the particular application vendor and type of server (e.g., NT, UNIX, Novell). The server 206 reads and transmits the command 226a to the intelligent tape controller 208, where the command 226a has information as to where the data 218 is located within the first storage unit 214 (as shown) and/or the second storage unit 222 and how the data will be formatted. The transmitting of information containing the locations of data as compared to the data itself is referred to as "indirect data."

There are several reasons for transmitting only the locations of the data 218 and not the data itself to the intelligent tape controller 208. First, the value of current backup applications is preserved. Secondly, the transmitting of the locations of data 218 is independent of the file system and cluster technology. Lastly, the server 206 can assure the integrity of the data 218 by holding and releasing locks on associated files being backed up while the intelligent tape controller 208 is copying the data.

The intelligent tape controller 208 receives the command 226a containing the locations of the data 218 via a protocol 230. The protocol 230 is generally an asynchronous and pipelined protocol that permits the server 206 to queue a number of operations concurrently. The protocol 230 implements a set of messages 236 (e.g., operations, function calls) to form a distributed interface such that the messages can be transmitted back-and-forth between the intelligent tape controller 208 and the server 206. The protocol 230 may utilize either the system network 202 or the storage area network 212 to communicate between the intelligent tape controller 208 and the server 206.

The protocol 230 preferably includes a normal channel 232 and a priority channel 234 on which the messages 236, command 226a and direct data 235 (discussed later with reference to Bridge Mode) are communicated between the server 206 and the intelligent tape controller 208. The messages 236, command 226a and direct data 235 can be queued to either the normal channel 232 or the priority channel 234.

The messages 236 transmitted on the normal channel 232 are queued and executed in a predetermined order (e.g., first-in-first-out). Whereas, the messages 236 transmitted on the priority channel 234 are generally executed by the intelligent tape controller 208 or the server 206 before any new messages transmitted on the normal channel 232 are executed. The priority channel 234 permits control of operations while the normal channel 232 may be paused for operations such as a tape exception. In contrast, the priority channel 234 is generally not paused. Alternatively, the protocol 230 could utilize a single channel instead of the normal channel 232 and the priority channel 234.

In addition to transmitting the locations of the data 218 (e.g., indirect data), the server 206 operating in Bridge Mode may transmit the direct data 235 to the intelligent tape controller 208. The direct data 235 includes file(s) and/or image(s) that can be reformatted by the intelligent tape controller 208 and merged (optional) with the data 218 received by the intelligent tape controller 208 operating in Peer Mode.

The set of messages 236 generally encompasses five types of messages including configuration and control messages 238, write messages 240, read messages 242, intelligent controller initiated messages 244 and secondary storage unit positioning messages 246. The messages 236 are used to perform operations that are similar to what their titles imply. In response to receiving any of the messages 236, the intelligent tape controller 208 generates and transmits at least one reply message 248 back to the server 206 or host 228. Each reply message 248 indicates whether the operation (e.g., receipt of command) has been completed.

The configuration and control messages 238 include format operations that direct the intelligent tape controller 208 how the data 218 or the direct data 235 (if any) should be formatted as they move through the intelligent tape controller. In addition, the command 226a may include format information used by the intelligent tape controller 208 to format the data 218. The formatting of direct data 235 and data 218 generally occurs within the intelligent tape controller 208 but also may occur within the tape drive 222. There are several format options available that include tape block size, padding, residual data removal, byte swapping (e.g., Big endian, Little endian), compression and encryption.

The intelligent tape controller 208 operating in Peer Mode effectively retrieves the data 218 from the disk drive 214 and writes the retrieved data to the tape drive 222. The intelligent tape controller 208 may reformat the retrieved data prior to writing the retrieved data to the tape drive 222.

The intelligent tape controller 208 can also be used to restore (e.g., read) data from the tape drive 222 and write the restored data to the disk drive 214 while bypassing the host 228. The restoring of data from the tape drive 222 is similar to the transferring of data 218 to the tape drive, except that the transfer is in an opposite direction and different messages 236 may be used.

It should be noted that during certain stages of either the restoring or transferring of data, the intelligent tape controller 208 can transmit acknowledgment signals (e.g., reply messages 248) to the host 228. The acknowledgment signals can be sent to the host 228 or server 206 at various points including, for example, when data 218 is written to the tape drive 222 and when any request (e.g., command 226a) is received and checked for validity and security at the intelligent tape controller 208. Also, acknowledgment signals can be sent when the data 218 is received by the intelligent tape controller 208 since at this point the host 228 need not maintain a lock on the file within the disk drive 214 containing the data 218.

As mentioned earlier, the intelligent tape controller 208 utilizes the messages 236 and protocol 230 to communicate with the host 228. The host 228 is capable of performing high level error handling (e.g., fault recovery) in addition to the robotic control of the intelligent tape controller 208.

Referring to FIG. 3, there is illustrated the storage management method 400 that may be used by the computer system 200. Beginning at stage 402 of the storage management method 400, the computer system 200 utilizes the protocol 230 (preferably) to connect the host 228 or server 206 to the intelligent controller 208.

At stage 404, the host 228 transmits the command 226a to the intelligent tape controller 208 using the protocol 230. The command 226a can include format instructions and location information about where the data 218 is stored within the disk drive 214. The format instructions are used by the intelligent tape controller 208 to format the direct data 235 (if any) or the data 218 (indirect data).

At stage 406, the intelligent tape controller 208 operates to move the data 218 between the disk drive 214 and the tape drive 222 through the storage area network 212 and the intelligent tape controller while bypassing the host 228. More specifically, the data 218 is retrieved (e.g., copied or moved) from the disk drive 214 and written to the tape drive 222, or the data is restored from the tape drive and written to the disk drive.

At stage 408 (optional), the computer system 200 can use the host 228 to transmit the direct data 235 directly to the intelligent tape controller 208 from which the direct data may be written to the disk drive 214 or the tape drive 222. This type of operation has been referred to earlier as the Bridge Mode.

From the foregoing, it can be readily appreciated by those skilled in the art that the present invention provides a computer system and storage management method using an intelligent controller and storage area network for routing data between peer-level storage units while bypassing a server and workstation. Also, the computer system as disclosed frees the server from moving data through its memory and interconnects during backup or archival procedures.

Although one embodiment of the method and apparatus of the present invention has been illustrated in the accompanying Drawings and described in the foregoing Detailed Description, it will be understood that the invention is not limited to the embodiments disclosed, but is capable of numerous rearrangements, modifications and substitutions without departing from the spirit as set forth and defined by the following claims.

What is claimed is:

1. A computer system comprising:
   a first storage unit;
   a storage area network coupled to the first storage unit;
   a second storage unit;
   an intelligent controller coupled to the storage area network and to the second storage unit, the intelligent controller controlling both the first storage unit and the second storage unit; and
   a host coupled to the storage area network comprising an application module for generating and transmitting a command to the intelligent controller,
   where the intelligent controller, in response to the command, transfers data, under the autonomous control of the intelligent controller, between the first storage unit and the second storage unit through the storage area network while bypassing the host.

2. The computer system of claim 1, comprising a protocol having at least one channel for interfacing the host to the intelligent controller and for transmitting the command from the host to the intelligent controller.

3. The computer system of claim 2, wherein the protocol comprises a plurality of messages.

4. The computer system of claim 3, wherein the plurality of messages comprises a selected one of configuration and control messages, write messages, read messages, intelligent controller initiated messages and second storage unit positioning messages.

5. The computer system of claim 1, comprising a system network for connecting the host to the intelligent controller.

6. The computer system of claim 5, wherein the system network comprises a selected one of a system area network, a local area network and a wide area network.

7. The computer system of claim 1, wherein the command comprises information regarding where the data is located within a selected one of the first storage unit and the second storage unit.

8. The computer system of claim 7, wherein the command comprises information regarding how the data is to be formatted by the intelligent controller.

9. The computer system of claim 1, wherein the host comprises a workstation.

10. The computer system of claim 1, wherein the host comprises a workstation and a server.

11. The computer system of claim 1, wherein the first storage unit and the second storage unit comprise a selected one of a disk drive, a tape drive, and an optical drive.

12. The computer system of claim 1, wherein the data comprises a selected one of a file and an image.

13. The computer system of claim 1, wherein the intelligent controller comprises means for retrieving the data from the first storage unit and for writing the retrieved data to the second storage unit.

14. The computer system of claim 13, wherein the intelligent controller comprises means for formatting the retrieved data.

15. The computer system of claim 1, wherein the intelligent controller comprises means for restoring the data from the second storage unit and for writing the data to the first storage unit.

16. The computer system of claim 1, wherein the intelligent controller comprises means for communicating a reply message to the host.

17. The computer system of claim 1, wherein the storage area network comprises a Fibre Channel network.

18. The computer system of claim 1, wherein the application module comprises means for handling high level errors and robotic control.

19. The computer system of claim 1, wherein the application module comprises means for locking and unlocking the data located in the first storage unit.

20. The computer system of claim 1, wherein the intelligent controller comprises means for transferring data directly between the host and the second storage unit.

21. A computer system comprising:
at least one disk drive;
a storage area network coupled to the at least one disk drive;
at least one tape drive;
an intelligent tape controller coupled to the storage area network and to the at least one tape drive, the intelligent tape controller controlling both the at least one disk drive and the at least one tape drive; and
a host comprising a backup-application module for generating and transmitting a command to the intelligent tape controller, where the intelligent tape controller, in response to the command, transfers data, under the autonomous control of the intelligent tape controller, between the at least one disk drive and the at least one tape drive through the storage area network while bypassing the host.

22. The computer system of claim 21, comprising an asynchronous protocol, the protocol comprising a plurality of messages.

23. The computer system of claim 21, comprising a local area network for connecting the host to the intelligent tape controller.

24. The computer system of claim 21, wherein the command comprises information regarding where the data is located within the at least one disk drive.

25. The computer system of claim 21, wherein the host comprises a selected one of a workstation and a combination of a workstation and a server.

26. The computer system of claim 21, wherein the data comprises a selected one of a file and an image.

27. The computer system of claim 21, wherein the intelligent tape controller comprises means for retrieving the data from the at least one disk drive and for writing the retrieved data to the at least one tape drive.

28. The computer system of claim 27, wherein the intelligent tape controller comprises means for formatting the retrieved data prior to writing the retrieved data to the at least one tape drive.

29. The computer system of claim 21, wherein the intelligent tape controller comprises means for restoring the data from the at least on tape drive and for writing the restored data to the at least one disk drive.

30. The computer system of claim 21, wherein the at least one tape drive comprises a library of tape drives.

31. A method for moving data between a first storage unit and a second storage unit, the method comprising the steps of:
connecting a host to an intelligent controller;
transmitting a command from the host to the intelligent controller, where the command contains location information on the data; and
transferring the data, under the autonomous control of the intelligent controller, in response to the transmitted command, between the first storage unit and the second storage unit through a storage area network and the intelligent controller while bypassing the host.

32. The method claim 31, comprising the step of communicating at least one reply message from the intelligent controller to the host.

33. The method of claim 31, wherein the step of transferring comprises the steps of retrieving the data from the first storage unit, and writing the retrieved data to the second storage unit.

34. The method of claim 33, wherein the step of transferring comprises the step of formatting the retrieved data.

35. The method of claim 31, wherein the step of transferring comprises the steps of restoring the data from the second storage unit, and writing the restored data to the first storage unit.

36. The method of claim 31, comprising the step of transferring additional data directly from the host to the second storage unit.

* * * * *